US010253188B2

(12) United States Patent
Berteloot et al.

(10) Patent No.: US 10,253,188 B2
(45) Date of Patent: Apr. 9, 2019

(54) COMPOSITION COMPRISING A CONTINUOUS ORGANIC PHASE AND A WATER-IN-OIL EMULSION FOR COVERING A METAL SURFACE, AND METHOD FOR PRODUCING SAID COMPOSITION

(71) Applicant: SOCIETE NOUVELLE DES COULEURS ZINCIQUES, Bouchain (FR)

(72) Inventors: Christelle Berteloot, Fenain (FR); Ludovic Mavel, Hordain (FR); Alexander Gibb, Vaureal (FR); Jérôme Bibette, Paris (FR); Damien Demoulin, Paris (FR)

(73) Assignee: SOCIETE NOUVELLE DES COULEURS ZINCIQUES, Bouchain (FR)

( * ) Notice: Subject to any disclaimer, the term of this patent is extended or adjusted under 35 U.S.C. 154(b) by 0 days.

(21) Appl. No.: 14/907,680

(22) PCT Filed: Jul. 16, 2014

(86) PCT No.: PCT/EP2014/065235
§ 371 (c)(1),
(2) Date: Jan. 26, 2016

(87) PCT Pub. No.: WO2015/010987
PCT Pub. Date: Jan. 29, 2015

(65) Prior Publication Data
US 2016/0160056 A1   Jun. 9, 2016

(30) Foreign Application Priority Data

Jul. 26, 2013 (FR) .................................. 13 57417

(51) Int. Cl.
*C09D 5/08* (2006.01)
*C09D 5/00* (2006.01)
(Continued)

(52) U.S. Cl.
CPC ............. *C09D 5/084* (2013.01); *C09D 5/002* (2013.01); *C09D 5/024* (2013.01); *C09D 5/082* (2013.01); *C09D 7/61* (2018.01)

(58) Field of Classification Search
CPC ........ C09D 5/002; C09D 5/024; C09D 5/082; C09D 5/084; C09D 7/61
See application file for complete search history.

(56) References Cited

U.S. PATENT DOCUMENTS

| 6,254,980 B1 * | 7/2001 | Tadokoro | C09D 5/082 |
| | | | 252/389.52 |
| 2004/0026261 A1 * | 2/2004 | Stoffer | C09D 5/084 |
| | | | 205/261 |

(Continued)

FOREIGN PATENT DOCUMENTS

EP   1 842 881 A1   10/2007
JP   2000-309879 A   11/2000
(Continued)

OTHER PUBLICATIONS

R. Milic, "Anticorrosion pigments in water-thinned coatings," Int. Conf. Prod. Appl. Spec. Inorg. Pimg. Database Caplus Chemical Abstracts Service, Sep. 17, 1994, XP002721311.

*Primary Examiner* — Michael A Salvitti
(74) *Attorney, Agent, or Firm* — Baker & Hostetler LLP

(57) ABSTRACT

A composition to cover a metal surface comprises an organic continuous phase comprising at least one anticorrosive pigment, and a hydrophilic phase dispersed in the organic continuous phase, the hydrophilic phase comprising a chemical agent for the surface treatment of the metal surface. The surface treatment chemical agent can advanta- (Continued)

geously be cerium nitrate. A process for the manufacture of a composition according to the present invention is provided.

21 Claims, 5 Drawing Sheets

(51) Int. Cl.
    *C09D 5/02*     (2006.01)
    *C09D 7/61*     (2018.01)

(56) References Cited

U.S. PATENT DOCUMENTS

| | | | | |
|---|---|---|---|---|
| 2004/0079647 A1* | 4/2004 | Warburton | ............... | B05D 7/16 205/170 |
| 2004/0104378 A1* | 6/2004 | Bhatia | .................... | C09D 5/084 252/389.54 |
| 2004/0167266 A1* | 8/2004 | Hasegawa | .......... | C08G 18/0814 524/406 |
| 2005/0074626 A1* | 4/2005 | Lorenz, Jr. | ................ | C09D 5/24 428/626 |
| 2008/0063804 A1* | 3/2008 | Stoffer | ................... | B05D 7/142 427/409 |
| 2009/0117369 A1* | 5/2009 | Jaworowski | ............. | C09D 5/02 428/332 |
| 2009/0318612 A1* | 12/2009 | Plehiers | ................ | C09D 5/106 524/588 |
| 2010/0098956 A1* | 4/2010 | Sepeur | ................... | C09D 5/084 428/457 |
| 2012/0094128 A1* | 4/2012 | Foscante | ............... | C09D 5/084 428/413 |
| 2013/0046048 A1* | 2/2013 | Poelker | .................. | C09K 8/602 524/317 |
| 2016/0160056 A1* | 6/2016 | Berteloot | ............... | C09D 5/002 252/389.2 |

FOREIGN PATENT DOCUMENTS

| | | |
|---|---|---|
| JP | 2004-182988 A | 7/2004 |
| WO | 2010/018763 A1 | 2/2010 |

\* cited by examiner

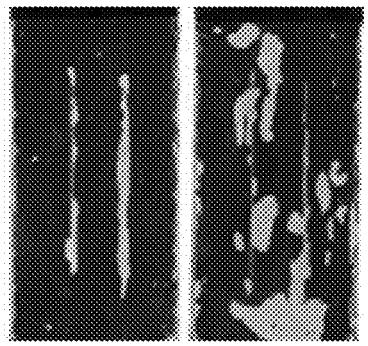 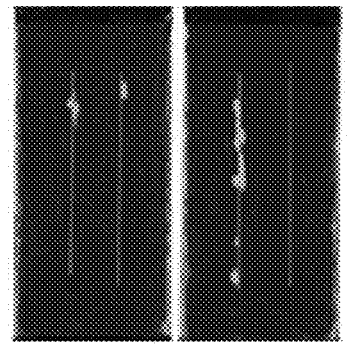
FIG.5a FIG.5b    FIG.5c FIG.5d
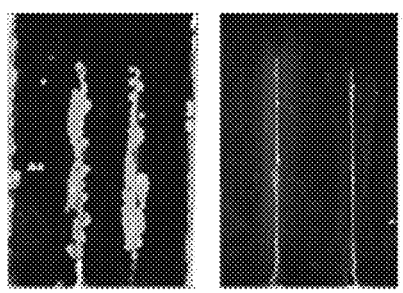 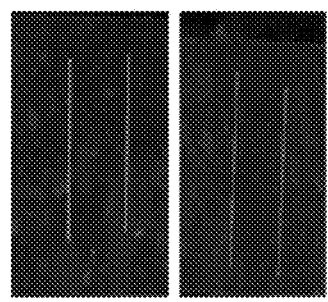
FIG.6a  FIG.6b    FIG.6c  FIG.6d
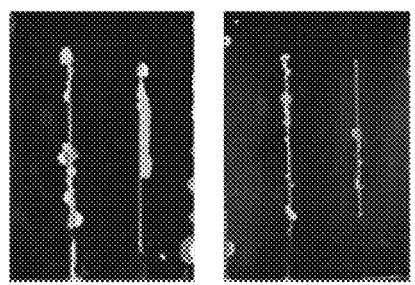 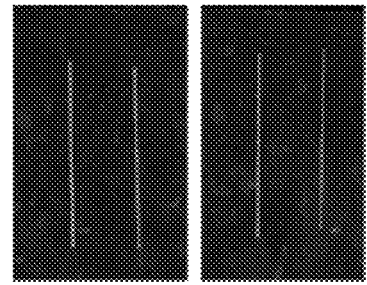
FIG.7a  FIG.7b    FIG.7c FIG.7d

 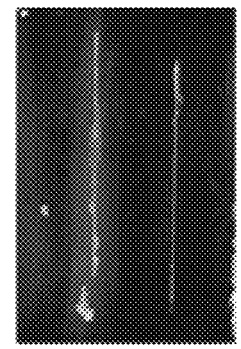
FIG.8a    FIG.8b
 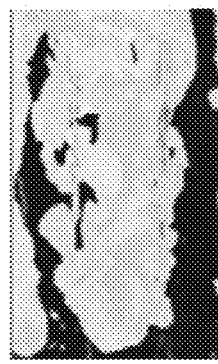 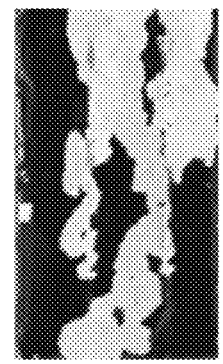
FIG.9a    FIG.9b    FIG.9c
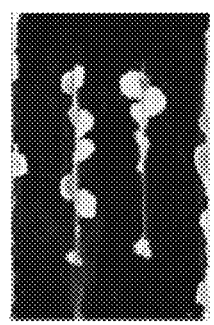 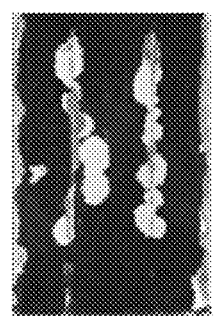 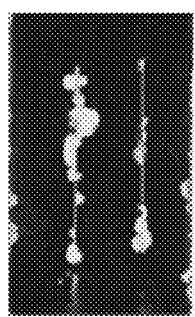
FIG.10a  FIG.10b  FIG.10c

COMPOSITION COMPRISING A CONTINUOUS ORGANIC PHASE AND A WATER-IN-OIL EMULSION FOR COVERING A METAL SURFACE, AND METHOD FOR PRODUCING SAID COMPOSITION

CROSS-REFERENCE TO RELATED APPLICATIONS

This application is a National Stage of International patent application PCT/EP2014/065235, filed on Jul. 16, 2014, which claims priority to foreign French patent application No. FR 1357417, filed on Jul. 26, 2013, the disclosures of which are incorporated by reference in their entirety.

FIELD OF THE INVENTION

The field of the invention is that of compositions intended to make possible the preparation of a coating on a metal surface which is capable in particular of providing good protection of the surface.

BACKGROUND

Advantageously, the composition can act as paint primer, finding very diverse applications for which the provision of coatings providing good protection against corrosion phenomena has been induced.

In this field, currently agents such as chromates are used as they are powerful oxidizing agents and thus also effective antioxidants for surfaces which they protect in the presence of water and oxygen. They are used as anticorrosive pigments in organic formulations (paints) and are not very soluble in water.

Nevertheless, chromate salts are harmful due to their high oxidizing power and have to be replaced with other substances having weaker but less toxic antioxidant properties.

Generally, a paint applied to a metal ceases to be effective when an injury occurs at the surface. Water, in combination with atmospheric oxygen and atmospheric pollutants, then begins the process of corrosion of the metal, for example based on aluminum or iron.

In order to reinforce the protection of a metal surface to be coated, a first treatment, referred to as surface pretreatment, is generally carried out in the presence of surface treatment agents which are chemical agents which modify the surface to be coated in order to protect it.

At the same time, an adhesion primer or paint primer based on solvent, on resin, on catalyst and on inorganic fillers, including an entity known as anticorrosive pigment which is intended to reinforce the protection against corrosion of the surface which will be coated with it, is prepared.

Conventionally, this adhesion primer is deposited on the pretreated surface and then said primer is dried before carrying out the deposition of a paint finishing layer.

While the pretreatment operation is carried out in the presence of an aqueous solution, the operation of coating the adhesion primer is carried out in the solvent phase, the combined operations thus comprising two types of operations in different media.

Starting from this context and from all the parameters present, the applicant turned to the principles of encapsulation and of controlled release in order to enhance the performance of a functional agent. This concept has already been provided in various forms in fields as diverse as perfumery, detergency, medicine, medical imaging, cosmetics or food.

Generally, a colloidal vector provides effectiveness if it is capable of protecting the active principle as far as the site of delivery. In medicine, a well-known example relates to the passive capture by tumors of 50 nm colloids; if these colloids contain an active substance, it is naturally found enriched in the region to be treated. In industrial perfumery, for example, it will be a matter of prolonging the odor after opening the pack.

Thus, the applicant started from the principle that capsules of antioxidants should be able to deliver their contents locally in order to consume this oxygen while if possible repairing the injury in addition and provides a novel solution of a composition incorporating a hydrophilic phase including the surface treatment agent in an organic continuous phase.

In the field of paints, generally, the inclusion of a surface treatment agent has the objective of reproducing as best as possible the same properties as a conventional surface treatment of conversion treatment type. Its main role is the adhesion, which consequently makes possible better resistance to corrosion of the primer. The surface treatment chemical agent exhibits a solubility in aqueous solution of approximately 100%.

The anticorrosive pigments for their part make it possible to reduce the rates of corrosion. The water which pierces the film of paint will dissolve a portion of the pigment which, at its contact, forms impermeable screening precipitation compounds which prevent the water, the oxygen and the salts from reaching the metal. The anticorrosive pigment for its part exhibits a very low solubility in aqueous solution which can typically be of the order of a few ppm.

SUMMARY OF THE INVENTION

In this context, a subject matter of the present invention is a composition intended to cover a metal surface and comprising an organic continuous phase, said organic continuous phase comprising at least one anticorrosive pigment, characterized in that it additionally comprises a hydrophilic phase dispersed in said organic continuous phase, said hydrophilic phase comprising a chemical agent for the surface treatment of said metal surface.

According to an alternative form of the invention, the composition additionally comprises at least one surface-active agent which can be anionic, cationic, amphoteric, nonionic.

According to an alternative form of the invention, the organic phase comprises at least one resin.

According to an alternative form of the invention, the organic phase comprises a solvent.

According to an alternative form of the invention, the organic phase comprises at least one additive and/or at least one inorganic filler.

According to an alternative form of the invention, the anticorrosive pigment is a metal salt comprising:
a metal and/or alkali metal and/or alkaline earth metal cation, said metal being zinc or magnesium or calcium or aluminum or potassium or strontium or barium or molybdenum or a rare earth metal;
an anion being a chromate or a phosphate or a silicate or a borate or a carbonate or a polyphosphate or a molybdate.

According to an alternative form of the invention, the hydrophilic phase is water and/or an oxygen-comprising solvent and/or an alcohol and/or a ketone.

According to an alternative form of the invention, the surface treatment chemical agent comprises a compound of nitrate or tungstate or vanadate or permanganate or phosphate or phosphomolybdate or phosphotungstate or phosphite or sulfite or molybdate or tungstate or chromate or dichromate or polyphosphate or borate or zirconate or benzoate or citrate or salicylate or adipate type.

According to an alternative form of the invention, the surface treatment chemical agent comprises a cerium nitrate or a lanthanum nitrate.

According to an alternative form of the invention, the surface treatment chemical agent comprises an ammonium or potassium or sodium tungstate.

According to an alternative form of the invention, the surface treatment chemical agent comprises a sodium orthovanadate or a sodium metavanadate.

According to an alternative form of the invention, the surface treatment chemical agent comprises an ammonium or calcium or magnesium or sodium permanganate.

According to an alternative form of the invention, the surface treatment chemical agent comprises a monocalcium phosphate or a trisodium phosphate or a dibasic sodium phosphate or a monobasic sodium phosphate or a sodium polyphosphate or a sodium phosphate or a monobasic manganese phosphate.

According to an alternative form of the invention, the surface treatment chemical agent comprises a sodium phosphomolybdate.

According to an alternative form of the invention, the surface treatment chemical agent comprises a sodium phosphotungstate.

According to an alternative form of the invention, the surface treatment chemical agent comprises a dibasic sodium phosphite or a sodium hypophosphite or a calcium hypophosphite or a magnesium hypophosphite or a manganese hypophosphite.

According to an alternative form of the invention, the surface treatment chemical agent comprises a sodium or calcium sulfite.

According to an alternative form of the invention, the inorganic fillers comprise titanium oxide and/or silica and/or talc and/or mica and/or iron oxide and/or carbonates.

According to an alternative form of the invention, the additive is a catalyst or a drier or an accelerator or a curing agent.

According to an alternative form of the invention, the solvent is based on Dowanol PMA—2-methoxy-1-methylethyl acetate—from Brenntag and can additionally comprise Solvesso 150—naphthalene $C_{10}H_8$—from Exxon.

Another subject matter of the invention is a process for the manufacture of a composition according to the invention, characterized in that it comprises:

the preparation of an emulsion or of a microemulsion comprising:
  the preparation of a mixture of a hydrophilic phase with a surface treatment chemical agent and a solvent;
  a mechanical treatment of said mixture which makes it possible to obtain said emulsion or said microemulsion;
  the inclusion of said emulsion or said microemulsion in an organic continuous phase comprising at least one anticorrosive pigment.

According to an alternative form of the invention, the preparation of said mixture is carried out in the presence of a surface-active agent.

According to an alternative form of the invention, the organic phase comprises a solvent identical to that of said emulsion or microemulsion.

According to an alternative form of the invention, the organic phase additionally comprises a solvent, a resin, a catalyst and inorganic fillers.

BRIEF DESCRIPTION OF THE DRAWINGS

A better understanding of the invention will be obtained and other advantages will become apparent on reading the description which will follow, given without implied limitation, and by virtue of the figures, among which:

FIGS. 4a, 4b, 5a, 5b, 5c, 5d, 6a, 6b, 6c, 6d, 7a, 7b, 7c, 7d, 8a, 8b, 9a, 9b, 9c, 10a, 10b and 10c illustrate results of tests carried out on primers, with or without surface treatment, comprising different kinds of pigments, with or without surface treatment agent powder, with or without emulsion including a surface treatment agent, this being the case in the presence of salt spray or in a humid chamber.

DETAILED DESCRIPTION

Figure 1:
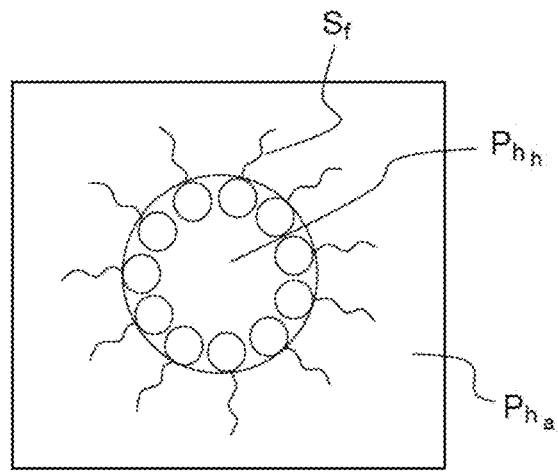
FIG. 1 illustrates the principle of a stable emulsion.

Generally, the composition of the present invention comprises an organic continuous phase and a hydrophilic phase dispersed in said organic continuous phase, the hydrophilic phase comprising a surface treatment chemical agent. FIG. 1 diagrammatically represents such a composition and demonstrates: the organic continuous phase $Ph_a$ and the hydrophilic phase $Ph_h$ comprising surfactant surface-active agents $S_f$ with a hydrophilic head and a hydrophobic tail.

According to the present invention, the hydrophilic phase additionally comprises a surface treatment chemical agent.

The invention will be described below in its use for adhesion primer intended to cover and protect a metal surface, in the context of paints, without limitation.

The applicant thus proposes to make use of the advantages which can be drawn from the concept of emulsion or microemulsion and to thus introduce surface treatment chemical agents of very small sizes into a conventional paint, the emulsion dispersing simply in said paint. In the absence of emulsion and in the presence of surface treatment particles, it would have been necessary to resort to a grinding step, constituting a loss in time and an increase in cost.

Figure 2A:
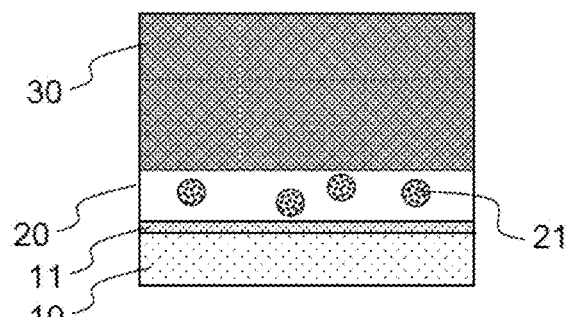
FIGS. 2a and 2b illustrate a paint coating respectively using a primer according to the known art and a primer according to the present invention.

FIG. 2a illustrates, on this account, a paint coating according to the known art of a metal surface 10 comprising a surface treatment layer 11, an adhesion primer 20, after phases of application and of drying and comprising an anticorrosive pigment 21, and a finishing layer 30.

Figure 2B:
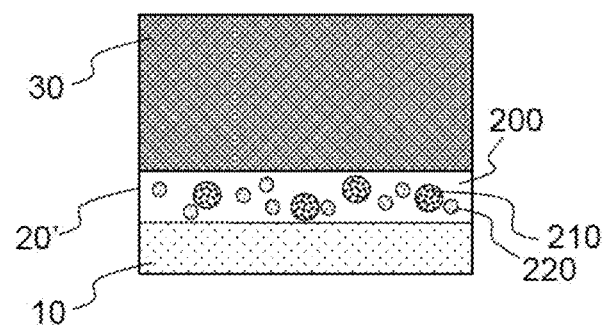

FIG. 2b illustrates a paint coating incorporating the composition of the present invention, with an adhesion primer 20' after phases of application and of drying and comprising an organic continuous phase 200 comprising in particular an anticorrosive pigment 210 and an emulsion 220 including, in a hydrophilic phase, a surface treatment chemical agent.

The applicant has carried out different comparative tests in order to demonstrate the advantage and the performance of the composition of the present invention intended to cover a metal surface.

The applicant mentions that it is possible to vary several parameters in order to have the best possible performance: the size of the droplets, the concentration of active principle (surface treatment chemical agent) in the droplets, the concentration of the emulsion in the film and the porosity of the film intended to be deposited on a metal surface to be covered.

The present invention will be described below in detail in a nonlimiting example using cerium nitrate, with which tests have made it possible to validate the concept and the advantage of the use of a hydrophilic phase in hydrophobic phase inverse emulsion, this being the case in the context of adhesion primers for paint.

In a first step, the applicant analyzed the stability of the hydrophilic phase in organic continuous phase inverse emulsion according to the present invention.

The protocol followed by the applicant is as follows:
products for preparing said emulsion:
  solvent 62% Solvesso 150/38% PMA;
  surface-active or surfactant: Disperbyk 2025 from Byk;
  salt water with several concentrations of cerium nitrate;
mixing of all the components;
emulsifying said mixture with an ultrasonic probe;
observing the results after 2 weeks at ambient temperature.

First Stability Study: Charging with 50 g/l of $Ce(NO_3)_3 \cdot 6H_2O$

Figure 3A:
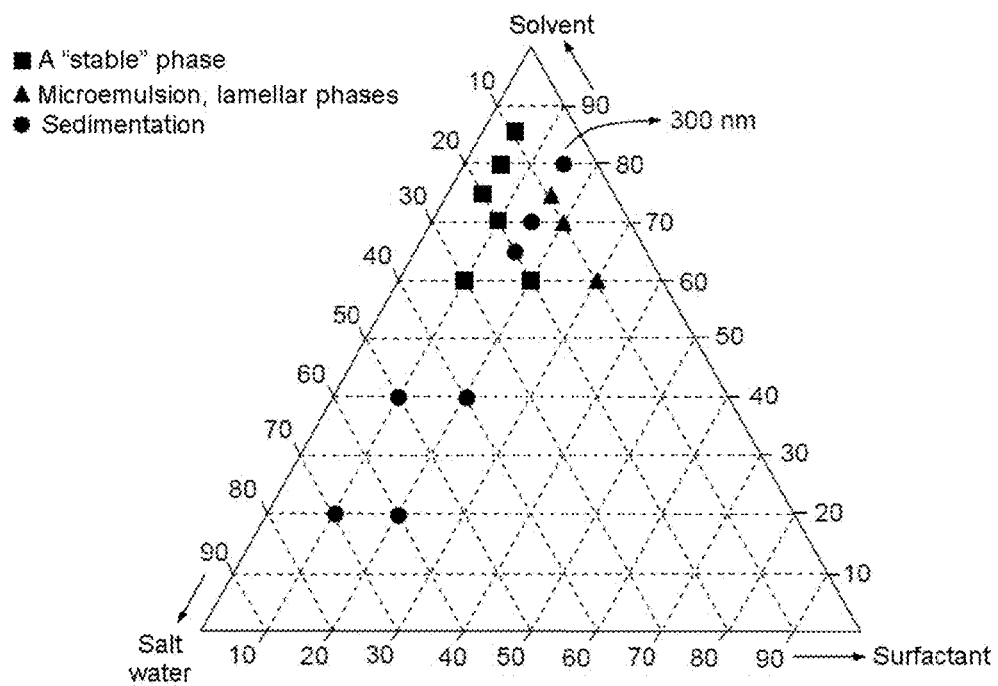
FIGS. 3a, 3b and 3c illustrate phase diagrams of a solvent, salt water and surface treatment agent mixture which make it possible to demonstrate the stability of a hydrophilic phase in organic phase inverse emulsion used in the composition of the present invention.

The phase diagram illustrated in FIG. 3a, which demonstrates percentages with which success is achieved in obtaining microemulsions, is obtained.

Second Stability Study: Charging with 400 g/l of $Ce(NO_3)_3 \cdot 6H_2O$

Figure 3B:
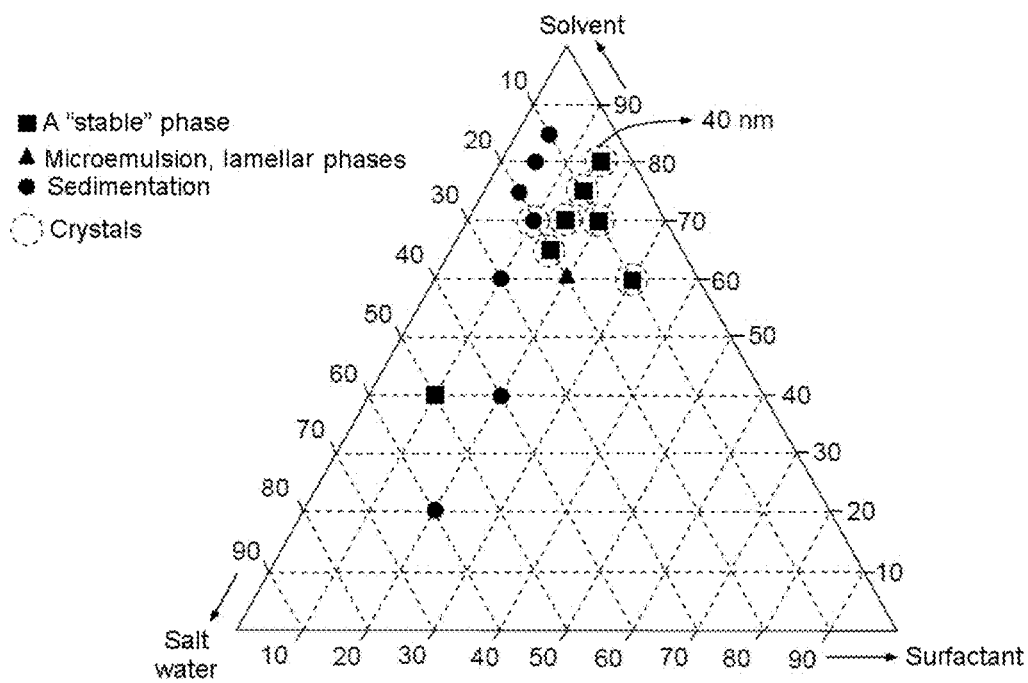

The phase diagram illustrated in FIG. 3b, which demonstrates percentages with which success is achieved in obtaining microemulsions and the appearance of crystals, is obtained.

Third Stability Study: Charging with 2000 g/l of $Ce(NO_3)_3 \cdot 6H_2O$

Figure 3C:
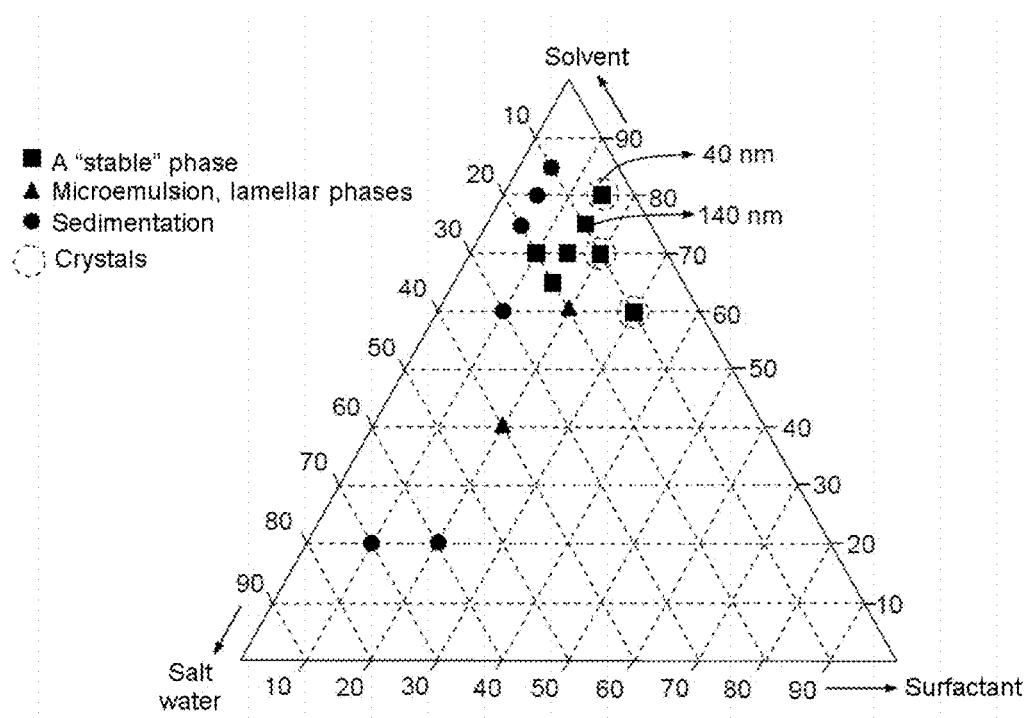

The phase diagram illustrated in FIG. 3c, which demonstrates percentages with which success is achieved in obtaining microemulsions and the appearance of crystals, is obtained.

The applicant has thus demonstrated:
the effect of the concentration of salt, i.e. a decrease in the surface tension when the amount of salt increases: the drops are smaller and thus the emulsion is more stable;
the presence of a microemulsion or lamellar phase similar to a nanoemulsion;
a fairly large stability range of the emulsion: the minimization of the risk of destabilization of the emulsion if the composition varies slightly;
a problem of crystallization of the salt: this crystallization is related to the maturing of the drops (diffusion towards the continuous phase) and is promoted by a small size of the drops (increase in the internal pressure of the drops), and which corresponds to 10% to 20% of the initial amount of salt.

In a second step, the applicant mixed the stable emulsion obtained above with conventional constituents of a paint primer intended to cover a metal surface, said primer being commonly known as coil coating primer.

The formula of the coil coating primer is as follows.

The organic phase comprises an HMMM Hexamethoxymethyl Melamine resin, a polyester resin and the mixture of solvents and more specifically:

| Starting Materials | Weight | Functionality |
|---|---|---|
| Cymel C303 | 5.4% | HMMM Hexamethoxymethyl Melamine resin |
| Desmophen 1665 | 47.6% | Polyester resin |
| Solvesso 150 | 10.7% | Aromatic solvent Naphthalene |
| Dowanol PMA | 15.4% | Solvent Glycol ether |

The organic phase is mixed with these inorganic fillers, including the anticorrosive pigment Novinox XCA02 from SNCZ, silica with calcium, until a homogeneous preparation is obtained.

| | | |
|---|---|---|
| Novinox XCA02 | 7% | Anticorrosive pigment |
| $TiO_2$ RTC90 | 6.5% | Titanium dioxide |
| Talc HAR T84 | 6.5% | Filler |
| Aerosil R972 | 0.4% | Silicon dioxide |

The mixture obtained above is then ground until a fineness of 8, measured with a Hegman gauge, is obtained.

0.5% by weight of Nacure 2500 catalyst from King Industries is added thereto.

The applicant has attempted to show the advantages of the inclusion of the emulsion in this primer.

The description of the composition of N41 is described in the table below.

| Compound | Content | Breakdown | Content in the formula |
|---|---|---|---|
| Solvent | 76% | 38% PMA<br>62% Solvesso 150 | 28.9% PMA<br>47.1% Solvesso 150 |
| Water charged with salt | 10% | Containing a corrosion inhibitor | 10% 400 g/l $Ce(NO_3)_3 \cdot 6H_2O$ |
| Surfactant | 14% | 100% Disperbyk 2025 | 14% Disperbyk 2025 |

In a first stage, tests were undertaken in order to confirm that the inclusion of the emulsion N41 had not had negative impacts on the properties of the primer.

A test for confirming the satisfactory crosslinking of the primer containing the emulsion N41 was carried out.

The primer containing an anticorrosive pigment, Novinox XCA02, was compared with a primer containing the anticorrosive pigment, Novinox XCA02, plus 10% of the emulsion N41.

The primer is rubbed using a rag impregnated with MEK, Methyl Ethyl Ketone. The number of to-and-fro T/F movements, before the primer deteriorates, is counted as shown in the following table.

| | Novinox XCA02 primer without emulsion N41 | Novinox XCA02 primer + 10% emulsion N41 |
|---|---|---|
| MEK T/F test | 8 (D = 0) | 9 (D = 0)<br>9 (D = 30)<br>8 (D = 60) |

The results show that the inclusion of N41 does not have an effect on the crosslinking of the primers at D=0. The primer containing N41 is stable over time.

A bending test was carried out on the metal substrate in order to confirm the non-tearing of the primer containing the emulsion N41 applied to the metal substrate. The bending is carried out using a conical mandrel.

| % N41 in the Novinox XCA02 primer | Tearing |
|---|---|
| 0 | No tearing |
| 1 | No tearing |
| 3 | No tearing |

In conclusion, the primer containing the emulsion N41 is not torn.

An adhesion test was carried out on the metal substrate in order to confirm the satisfactory adhesion of the primer containing the emulsion N41 applied to the metal substrate. A crosshatch pattern is produced on the primer and an adhesive tape is deposited thereon; during the detachment of this adhesive tape, it is confirmed whether the primer remains intact.

| % N41 in the Novinox XCA02 primer | Adhesion |
|---|---|
| 0 | No detachment |
| 1 | No detachment |
| 3 | No detachment |

In conclusion, the primer containing N41 does not have an adhesion fault.

In a second stage, the anticorrosive properties of the emulsion N41 were verified by virtue of salt spray (standard ASTM B117) and humid chamber tests.

Figures 4A, 4B:
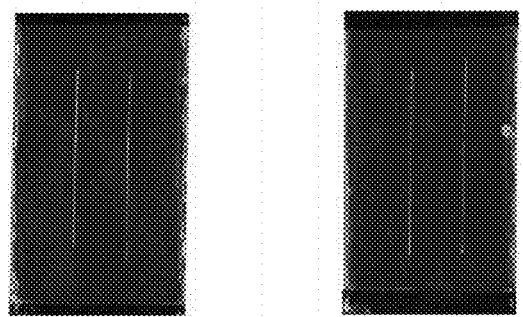

HDG (Hot Dip Galvanized Steel) plates were covered with primer comprising 7% by weight of a strontium chromate anticorrosive pigment (Reference L203E) from SNCZ and were tested, with a surface treatment (FIG. 4a) and without surface treatment (FIG. 4b):
  with surface treatment:
  in the presence of a salt spray for 300 hours, no blistering is observed;
  in a humid chamber for 300 hours, no blistering is observed;
  without surface treatment:
  in the presence of a salt spray for 300 hours, a small amount of blistering is observed;
  in a humid chamber for 300 hours, significant full-plate blistering is observed.

HDG (Hot Dip Galvanized Steel) plates were covered with primer comprising 7% by weight of the Novinox XCA02 pigment and were tested, with a surface treatment (FIG. 5a), without surface treatment (FIG. 5b), without surface treatment and with 1% of emulsion N41 (FIG. 5c) and without surface treatment and with 3% of emulsion N41:
  with surface treatment:
  in the presence of a salt spray for 300 hours, a small amount of blistering is observed;
  in a humid chamber for 300 hours, a small amount of blistering is observed;
  without surface treatment:
  in the presence of a salt spray for 300 hours, significant full-plate blistering is observed;
  in a humid chamber for 300 hours, a small amount of blistering is observed;
  without surface treatment with 1% N41:
  in the presence of a salt spray for 300 hours, a small amount of blistering is observed;
  in a humid chamber for 300 hours, a small amount of blistering is observed;
  without surface treatment with 3% N41:
  in the presence of a salt spray for 300 hours, a small amount of blistering is observed;
  in a humid chamber for 300 hours, a small amount of blistering is observed.

In conclusion, very good results are obtained when the emulsion N41 is added to a primer comprising Novinox XCA02 on a HDG substrate without surface treatment.

The 1% and 3% of N41 on Novinox XCA02 primer without surface treatment give better results than the primer comprising Novinox XCA02 on HDG without surface treatment and also on HDG with surface treatment, the surface treatment being carried out with the chromate-free product Chemetall Gardobond 4744.

The primer Novinox XCA02 coupled with 1% of N41 gives a performance which approaches that of the strontium chromate standard.

The applicant also carried out the following tests with a deposited primer:
  with a Gardobond 4744 surface treatment:
  with Novinox XCA02 as anticorrosive pigment in the presence of a salt spray for 500 hours (FIG. 6a);
  with L203E as anticorrosive pigment in the presence of a salt spray for 500 hours (FIG. 6b);
  with Novinox XCA02 as anticorrosive pigment in a humid chamber for 500 hours (FIG. 6c);
  with L203E as anticorrosive pigment in a humid chamber for 500 hours (FIG. 6d);
  with a Gardobond 4744 surface treatment:
  with Novinox XCA02 as anticorrosive pigment and 1% of the emulsion 41 in the presence of a salt spray for 500 hours (FIG. 7a);
  with Novinox XCA02 as anticorrosive pigment and 3% of the emulsion 41 in the presence of a salt spray for 500 hours (FIG. 7b);
  with Novinox XCA02 as anticorrosive pigment and 1% of the emulsion 41 in a humid chamber for 500 hours (FIG. 7c);
  with Novinox XCA02 as anticorrosive pigment and 3% of the emulsion 41 in a humid chamber for 500 hours (FIG. 7d).

The primer Novinox XCA02 coupled with 3% of N41 gives a performance which approaches that of the strontium chromate standard with regard to Gardobond 4744 surface treatment.

In a third stage, a comparative test was carried out between cerium nitrate included in powder form in the primer comprising Novinox XCA02 and cerium nitrate included in emulsion form.

The primers were applied to HDG without surface treatment.

The observations were carried out after 500 hours of exposure to the salt spray and are illustrated by the figures mentioned below.

In the presence of a primer without cerium nitrate, the following full-plate observations are obtained:
  with the Novinox XCA02 pigment, that illustrated in FIG. 8a;
  with the L203E pigment, that illustrated in FIG. 8b.

In the presence of a primer with pigment Novinox XCA02 and cerium nitrate powder:
  with 0.02% by weight of cerium nitrate powder (FIG. 9a);
  with 0.04% by weight of cerium nitrate powder (FIG. 9b);
  with 0.12% by weight of cerium nitrate powder (FIG. 9c).

In the presence of a primer with a cerium nitrate emulsion N41 and Novinox XCA02 pigment:
with 0.5% by weight of emulsion (FIG. 10a);
with 1% by weight of emulsion (FIG. 10b);
with 3% by weight of emulsion (FIG. 10c).

Over all of these figures, the dark regions relate to the primer which resists well and adheres well, the light regions relating to the primer which has resisted poorly and which no longer adheres after the treatment experienced.

These tests clearly demonstrate the better performances obtained with an emulsion comprising a surface treatment agent rather than with a surface treatment agent included in powder form.

The invention claimed is:

1. A composition to cover a metal surface and comprising an organic continuous phase, said organic continuous phase comprising at least one resin, a solvent including 2-methoxy-1-methylethyl acetate and naphthalene $C_{10}H_8$, at least one anticorrosive pigment, and comprising a hydrophilic phase dispersed in said organic continuous phase, said hydrophilic phase comprising a surfactant and a chemical agent for the surface treatment of said metal surface, the surfactant having a hydrophilic head and a hydrophobic tail.

2. The composition as claimed in claim 1, further comprising at least one surface-active agent which can be anionic, cationic, amphoteric, nonionic.

3. The composition as claimed in claim 1, wherein the organic phase comprises at least one additive and/or at least one inorganic filler.

4. The composition as claimed in claim 1, wherein the anticorrosive pigment is a metal salt comprising:
a metal and/or alkali metal and/or alkaline earth metal cation, said metal being zinc or magnesium or calcium or aluminum or potassium or strontium or barium or a rare earth metal;
an anion being a chromate or a phosphate or a silicate or a borate or a carbonate or a polyphosphate.

5. The composition as claimed in claim 1, wherein the hydrophilic phase is water and/or an oxygen-comprising solvent and/or an alcohol and/or a ketone.

6. The composition as claimed in claim 1, wherein the surface treatment chemical agent comprises a compound of nitrate or tungstate or vanadate or permanganate or phosphate or phosphomolybdate or phosphotungstate or phosphite or sulfite or molybdate or tungstate or chromate or dichromate or polyphosphate or borate or zirconate or benzoate or citrate or salicylate or adipate type.

7. The composition as claimed in claim 6, wherein the surface treatment chemical agent comprises a cerium nitrate or a lanthanum nitrate.

8. The composition as claimed in claim 6, wherein the surface treatment chemical agent comprises an ammonium or potassium or sodium tungstate.

9. The composition as claimed in claim 6, wherein the surface treatment chemical agent comprises a sodium orthovanadate or a sodium metavanadate.

10. The composition as claimed in claim 6, wherein the surface treatment chemical agent comprises an ammonium or calcium or magnesium or sodium permanganate.

11. The composition as claimed in claim 6, wherein the surface treatment chemical agent comprises a monocalcium phosphate or a trisodium phosphate or a dibasic sodium phosphate or a monobasic sodium phosphate or a sodium polyphosphate or a sodium phosphate or a monobasic manganese phosphate.

12. The composition as claimed in claim 6, wherein the surface treatment chemical agent comprises a sodium phosphomolybdate.

13. The composition as claimed in claim 6, wherein the surface treatment chemical agent comprises a sodium phosphotungstate.

14. The composition as claimed in claim 6, wherein the surface treatment chemical agent comprises a dibasic sodium phosphite or a sodium hypophosphite or a calcium hypophosphite or a magnesium hypophosphite or a manganese hypophosphite.

15. The composition as claimed in claim 6, wherein the surface treatment chemical agent comprises a sodium or calcium sulfite.

16. The composition as claimed in claim 3, wherein the inorganic fillers comprise titanium oxide and/or silica and/or talc and/or mica and/or iron oxide and/or carbonates.

17. The composition as claimed in claim 3, wherein the additive is a catalyst or a drier or an accelerator or a curing agent.

18. A process for the manufacture of a composition as claimed in claim 1, comprising:
the preparation of an emulsion or of a microemulsion comprising:
the preparation of a mixture of a hydrophilic phase with a surface treatment agent and a solvent;
a mechanical treatment of said mixture which makes it possible to obtain said emulsion or said microemulsion;
the inclusion of said emulsion or said microemulsion in an organic continuous phase comprising at least one anticorrosive pigment.

19. The process for the manufacture of a composition as claimed in claim 18, wherein the preparation of said mixture is carried out in the presence of a surface-active agent.

20. The process for the manufacture of a composition as claimed in claim 18, wherein the organic phase comprises a solvent identical to that of said emulsion or microemulsion.

21. The process for the manufacture of a composition as claimed in claim 18, wherein the organic phase additionally comprises a solvent, a resin, a catalyst and inorganic fillers.

* * * * *